(12) United States Patent
Abe et al.

(10) Patent No.: US 10,073,556 B2
(45) Date of Patent: *Sep. 11, 2018

(54) LIQUID CRYSTAL DISPLAY DEVICE WITH TOUCH PANEL

(71) Applicant: Japan Display Inc., Tokyo (JP)

(72) Inventors: Hiroyuki Abe, Tokyo (JP); Hideo Sato, Tokyo (JP); Takayuki Suzuki, Tokyo (JP)

(73) Assignee: Japan Display Inc., Tokyo (JP)

( * ) Notice: Subject to any disclaimer, the term of this patent is extended or adjusted under 35 U.S.C. 154(b) by 36 days.

This patent is subject to a terminal disclaimer.

(21) Appl. No.: 15/252,813

(22) Filed: Aug. 31, 2016

(65) Prior Publication Data

US 2016/0370937 A1 Dec. 22, 2016

Related U.S. Application Data

(63) Continuation of application No. 14/314,345, filed on Jun. 25, 2014, now Pat. No. 9,459,482.

(30) Foreign Application Priority Data

Jun. 25, 2013 (JP) .................. 2013-133225

(51) Int. Cl.
*G06F 3/041* (2006.01)
*G02F 1/1337* (2006.01)
(Continued)

(52) U.S. Cl.
CPC .......... *G06F 3/0416* (2013.01); *G02F 1/1337* (2013.01); *G02F 1/1368* (2013.01);
(Continued)

(58) Field of Classification Search
CPC ...... G06F 3/0416; G06F 3/044; G06F 3/0412; G02F 1/1337; G02F 1/136286;
(Continued)

(56) References Cited

U.S. PATENT DOCUMENTS 5,392,058 A 2/1995 Tagawa
2006/0007085 A1 1/2006 Kim et al.
(Continued)

FOREIGN PATENT DOCUMENTS

| JP | 2009-244958 A | 10/2009 |
| JP | 2012-252108 A | 12/2012 |
| JP | 2013-083678 A | 5/2013 |

*Primary Examiner* — Mihir K Rayan
(74) *Attorney, Agent, or Firm* — Typha IP LLC

(57) ABSTRACT

A liquid crystal display device with a touch panel includes: display drive circuits that are disposed respectively at the outsides of the sides opposing to a display region, and that apply sequential scanning signal potentials to scanning signal lines; touch panel drive circuits that are disposed respectively further to the outsides of the display drive circuits, and that apply sequential drive pulses to a plurality or drive electrodes among common electrodes; and switching circuits that are disposed respectively at insides of the display drive circuits, and that switch between applying common electric potentials for controlling the alignment of the liquid crystal composition and applying a touch drive pulse that detects the touching to the display surface.

8 Claims, 16 Drawing Sheets

(51) Int. Cl.
*G02F 1/1362* (2006.01)
*G02F 1/1368* (2006.01)
*G06F 3/044* (2006.01)
*G02F 1/1343* (2006.01)
*G02F 1/1333* (2006.01)
*G02F 1/1335* (2006.01)
*G02F 1/1345* (2006.01)

(52) U.S. Cl.
CPC .... *G02F 1/13338* (2013.01); *G02F 1/134309* (2013.01); *G02F 1/136286* (2013.01); *G06F 3/044* (2013.01); *G06F 3/0412* (2013.01); *G02F 1/13454* (2013.01); *G02F 1/133514* (2013.01); *G02F 2001/133302* (2013.01); *G02F 2201/121* (2013.01); *G02F 2201/123* (2013.01)

(58) Field of Classification Search
CPC ............. G02F 1/1368; G02F 1/134309; G02F 1/13338; G02F 1/133514; G02F 1/13454; G02F 2201/123
See application file for complete search history.

(56) References Cited

U.S. PATENT DOCUMENTS

| | | |
|---|---|---|
| 2006/0232541 A1 | 10/2006 | Kudo et al. |
| 2010/0182273 A1 | 7/2010 | Noguchi et al. |
| 2010/0194695 A1* | 8/2010 | Hotelling ............... G06F 3/0412 345/173 |
| 2010/0253638 A1* | 10/2010 | Yousefpor ............ G06F 3/0412 345/173 |
| 2011/0043479 A1 | 2/2011 | Aerle et al. |
| 2011/0169788 A1* | 7/2011 | Abe ...................... G09G 3/3655 345/204 |
| 2012/0105338 A1 | 5/2012 | Lin et al. |
| 2012/0120020 A1 | 5/2012 | Lee |
| 2012/0262387 A1* | 10/2012 | Mizuhashi ............ G06F 3/0412 345/173 |
| 2012/0262389 A1 | 10/2012 | Kida et al. |
| 2012/0306844 A1 | 12/2012 | Abe et al. |
| 2013/0088483 A1 | 4/2013 | Abe et al. |
| 2013/0187887 A1 | 7/2013 | Mizuhashi et al. |
| 2013/0188104 A1 | 7/2013 | Aoki et al. |
| 2013/0328807 A1* | 12/2013 | Matsumoto ........... G06F 3/0416 345/173 |
| 2014/0062918 A1 | 3/2014 | Chen et al. |
| 2014/0111446 A1 | 4/2014 | Lee et al. |
| 2014/0111466 A1* | 4/2014 | Kim ........................ G06F 3/044 345/174 |
| 2014/0168161 A1 | 6/2014 | Sugita et al. |
| 2017/0003807 A1* | 1/2017 | Abe ...................... G06F 3/0416 |
| 2017/0228077 A1* | 8/2017 | Abe .................. G02F 1/134309 |

* cited by examiner

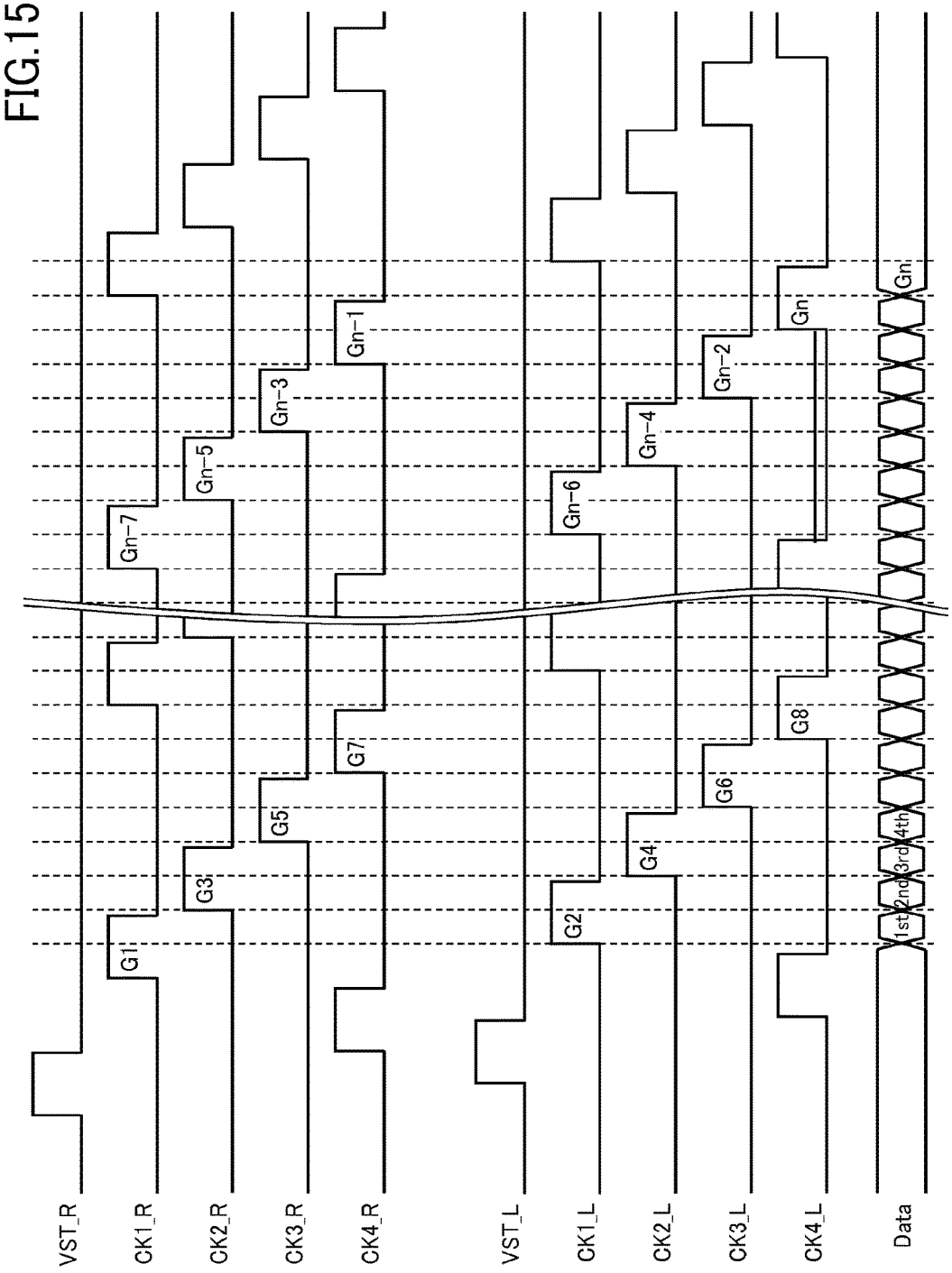

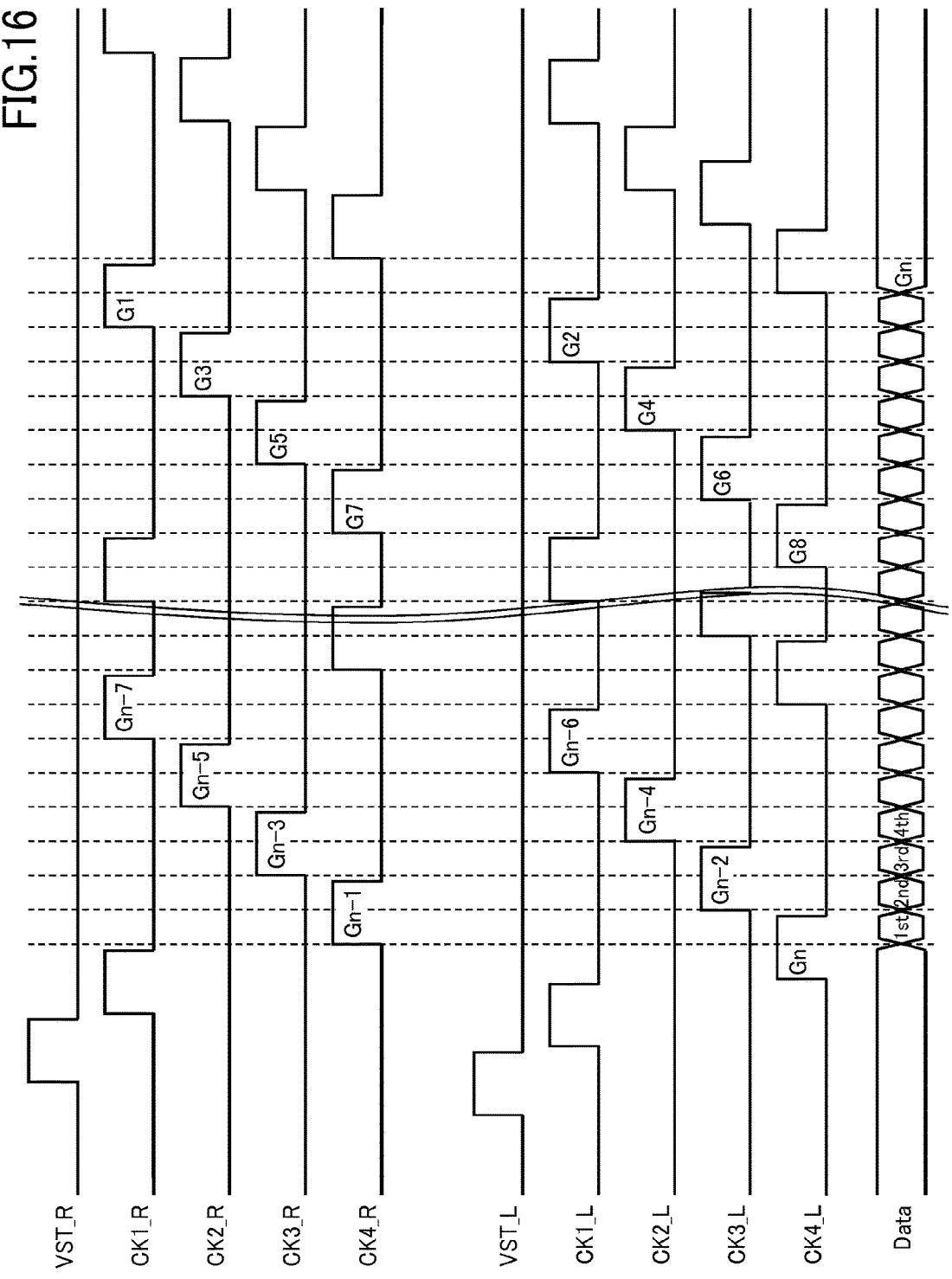

LIQUID CRYSTAL DISPLAY DEVICE WITH TOUCH PANEL

CROSS-REFERENCE TO RELATED APPLICATION

This application is a continuation of U.S. application Ser. No. 14/314,345, filed on Jun. 25, 2014. Further, this application claims priority from Japanese Patent Application No. JP2013-133225 filed on Jun. 25, 2013, the contents of which are hereby incorporated by reference into this application.

BACKGROUND OF THE INVENTION

1. Field of the Invention

The present invention relates to a liquid crystal display device with a touch panel.

2. Description of the Related Art

A touch panel that is disposed so as to overlap on a display screen of an information and communication terminal such as a computer is widely used as an input device. A liquid crystal display device which is typically spread as a display device is a device that displays an image by changing an alignment of liquid crystal composition confined between two substrates, a thin film transistor substrate (hereinafter, referred to as a TFT substrate) and a color filter substrate by a change in an electric field, and then, controlling the degree of light transmission passing through a liquid crystal panel. Among the liquid crystal display devices, in an in plane switching (IPS) type in which both of a pixel electrode and a common electrode are disposed on the TFT substrate side, a so-called transverse electric field is formed, and a display with a wide viewing angle is realized.

The touch panel is an input device that recognizes coordinates on the panel touched by user's fingers, which causes a processing device to perform processing. As types of the touch panels, a resistance film type in which a change of resistance value at the touched point is detected, a light sensor type in which a change of a light amount at the point where the light is blocked by the touching is detected, and an electrostatic capacitance coupling type in which a change of capacitance is detected, are known. The electrostatic capacitance coupling type is widely used due to the point that the display image quality does not deteriorate by a high transmittance of the panel, and the point that there is no contact with other electrodes, which results in a high durability.

In recent years, in regards to requests to make an information and communication terminal small and thin, the liquid crystal display device with a touch panel also is required to be made thin. In JP 2009-244958A, in the IPS typed liquid crystal display device, a thinner liquid crystal display device with a touch panel by using the common electrode of the liquid crystal display device as a drive electrode of the touch panel, is disclosed.

SUMMARY OF THE INVENTION

In the liquid crystal display device with a touch panel, a shift register circuit that applies a sequential voltage to the drive electrodes of the touch panel is needed. In a case where the shift register circuit is disposed in a driver IC (integrated circuit) which is disposed on the TFT substrate and a display region is wired from the driver IC, there is a difference in wiring length between the far portion of the display region and the near portion of the display region, and in order to wire with an equivalent resistance, it is necessary to make a wiring width of the far portion thick, and thus, it is necessary to make a frame region that is an outside region of the display region large.

The present invention is to provide a liquid crystal display device with a touch panel of which a frame region is reduced.

According to an aspect of the present invention, there is provided a liquid crystal display device with a touch panel that includes: a plurality of scanning signal lines that are extended and apposed so as to be commonly connected to a gate of each pixel transistor of pixels arranged in one direction, in a display region where the pixels are arranged in a matrix shape; common electrodes that are a plurality of electrodes extended so as to horizontally cross the display region in the one direction, and that control an alignment of liquid crystal composition by forming an electric field in combination with pixel electrodes connected to the pixel transistors; detection electrodes that are a plurality of electrodes extended so as to horizontally cross the display region in a different direction from the one direction, and that detect a contact position on a panel; display drive circuits that are disposed respectively at the outsides of the sides opposing the one direction of the display region, and that apply sequential scanning signal potentials to the scanning signal lines; touch panel drive circuits that are disposed respectively at further outsides of the display drive circuits and at the outsides of the sides opposing the one direction of the display region, and that apply sequential drive pulses to a plurality of drive electrodes among the common electrodes; and switching circuits that are disposed respectively at insides of the display drive circuits and at the outsides of the sides opposing to the one direction of the display region, and that switch between applying a common electric potential for controlling the alignment of the liquid crystal composition with respect to the plurality of drive electrodes and applying a touch drive pulse that detects the touching to the display surface.

In addition, in the aspect, the touch panel drive circuit and the display drive circuit may be configured with only single channel transistors of any of n channel or p channel.

In addition, in the aspect, the touch panel drive circuit may operate using two-phase clock.

In addition, in the aspect, in the display drive circuit, one of the display drive circuits disposed at the outside of each sides may apply a scanning signal potential only to the even-numbered scanning signal lines among the scanning signal lines and the other display drive circuit may apply a scanning signal potential only to the odd-numbered scanning signal lines among the scanning signal lines.

According to another aspect of the present invention, there is provided a liquid crystal display device with a touch panel that includes: a rectangular display region on which an image is displayed; and a drive IC disposition region where a drive IC is disposed at the outside of one side of the rectangular display region. Wirings extended to the outside of the display region from the drive IC so as not to cross the one side are arranged in a line in an order of far side from the display region, which are a clock signal line for driving the touch panel, a clock signal line for driving a display panel, and a switching signal line for selecting which to apply a touch panel drive signal or a display panel drive signal.

BRIEF DESCRIPTION OF THE DRAWINGS

FIG. 15 is a timing chart illustrating clock signals at the time of forward scanning and a gate signal line to which a High potential is output.

FIG. 16 is a timing chart illustrating clock signals at the time of reverse scanning and a gate signal line to which a High potential is output.

DETAILED DESCRIPTION OF THE INVENTION

Figure 1:
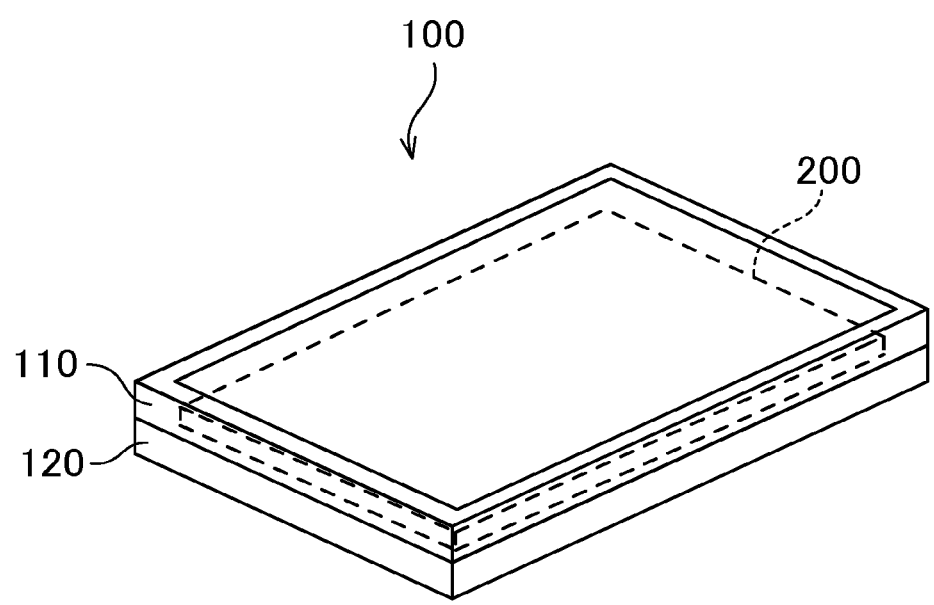
FIG. 1 is a diagram illustrating a liquid crystal display device with a touch panel in an embodiment of the present invention.

Hereinafter, an embodiment of the present invention will be described with reference to the drawings. In the drawings, the same components are referenced by the same numerals, and the description will not be repeated.

FIG. 1 is a diagram illustrating a liquid crystal display device 100 with a touch panel in an embodiment of the present invention. As illustrated in FIG. 1, the liquid crystal display device 100 with a touch panel is configured to include a liquid crystal display panel 200 with a touch panel, and an upper frame 110 and a lower frame 120 that are fixed so as to interpose the liquid crystal display panel 200 with a touch panel.

Figure 2:
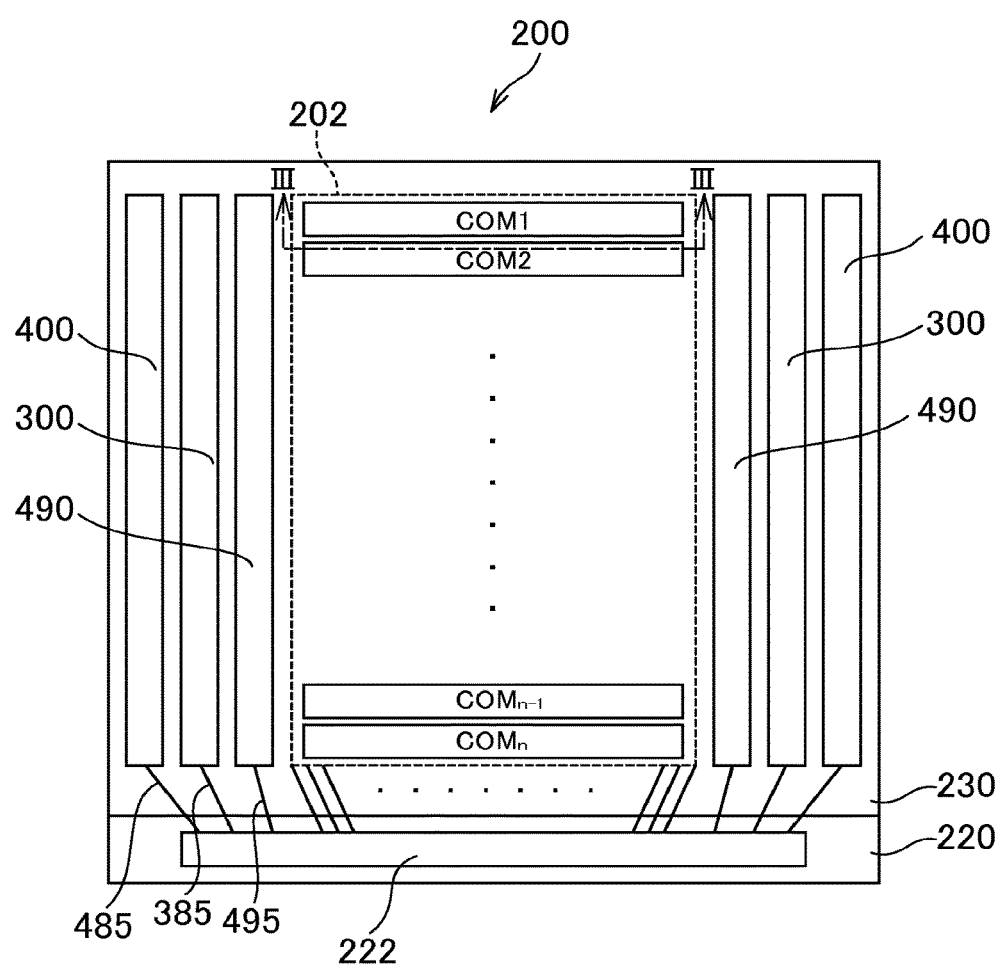
FIG. 2 is a diagram illustrating a configuration of a liquid crystal display panel with a touch panel in FIG. 1.

In FIG. 2, a configuration of the liquid crystal display panel 200 with a touch panel in FIG. 1 is illustrated. In the liquid crystal display panel 200 with a touch panel, two substrates of a thin film transistor (TFT) substrate 220 and a color filter substrate 230 are disposed to be superimposed, and a liquid crystal composition is confined in between the two substrates. In the portion where the substrates are superimposed, there is a display region 202 where an image is displayed, and in FIG. 2, strip-shaped common electrodes COM1 to COMn are illustrated, which act as common electrodes that are an electrode at the time of displaying and act as a touch panel drive electrode to which a drive pulse is applied at the time touching is detected.

At the outside of the both ends in a direction in which the common electrodes COM1 to COMn of the display region 202 extend, a switching circuit region 490, a display drive circuit 300, and a touch panel drive circuit 400 are formed in an order from the display region. The touch panel drive circuit 400 is a circuit that applies the drive pulses which are touch panel drive voltages with respect to the common electrodes COM1 to COMn in an order. The switching circuit region 490 is a region where a switching circuit 492 (refer to FIG. 7) for selecting whether to apply the touch panel drive voltage pulses to the common electrode COM1 to COMn based on the drive pulses output from the touch panel drive circuit 400 or to apply a common voltage that forms an electric field for aligning the liquid crystal composition together with a pixel electrode, is respectively formed with respect to the common electrodes COM1 to COMn. The display drive circuit 300 is a circuit that applies a high electric potential (active potential) for conducting between a source and a drain of a pixel transistor disposed on each pixel in an order with respect to scanning signal lines G1 to Gm (refer to FIG. 12) which are extended and apposed in the same direction as that of each of the common electrodes COM1 to COMn.

Here, both of the touch panel drive circuit 400 and the display drive circuit 300 are formed outside the sides where the end portion of the common electrodes COM1 to COMn of the display region 202 are arranged in parallel and the touch panel drive circuit 400 is formed at the outer side than the display drive circuit 300. This means that, in a case where both of the display drive circuit 300 and the touch panel drive circuit 400 are formed in parallel at the outside of the display region 202, the wiring to which the output of any one of the circuits is applied passes through the other circuit. Here, since the number of wirings which are output toward the display region 202 by the touch panel drive circuit 400 is less than the number of wirings which are output toward the display region 202 by the display drive circuit 300, the wiring density of the circuit is suppressed and the influence of the noise superimposed in the wiring is reduced by disposing the touch panel drive circuit 400 at the outer side than the display drive circuit 300.

By placing the switching circuit 492 existing in the switching circuit region 490 nearer to the common electrodes COM1 to COMn than to the display drive circuit 300, low resistance output to the common electrodes COM1 to COMn is performed, and the display quality is improved.

In addition, on the TFT substrate 220, a drive IC (integrated circuit) 222 is installed. The drive IC controls the switching circuit region 490, the display drive circuit 300, and the touch panel drive circuit 400, and supplies an electric potential corresponding to a gradation value of each pixel to a video signal line (not illustrated) that extends in a direction perpendicularly crossing the scanning signal lines G1 to Gm and that is connected to a drain of each pixel electrode. From the drive IC 222, a clock signal line 485 for driving the touch panel, a clock signal line 385 for driving the display panel, and a switch signal control line 495 for selecting to apply which of a touch panel drive signal or a display panel drive signal are connected in a order respectively with respect to the touch panel drive circuit 400, the display drive circuit 300, and the switching circuit region 490.

The common electrodes COM1 to COMn used in the liquid crystal display are disposed so as to cover the entire surface of the display region. However, in a case where the electrodes COM1 to COMn act as the drive electrode of the touch panel, it is not necessary for all of the electrodes COM1 to COMn to act as the drive electrode, but a part thereof may be electrically connected so as to act as the drive electrode. In this case, to the common electrode that acts only as the common electrode of the liquid crystal display, a common electric potential which is an electric potential of the common electrode may be applied or may be in a floating state or grounded.

Figure 3:
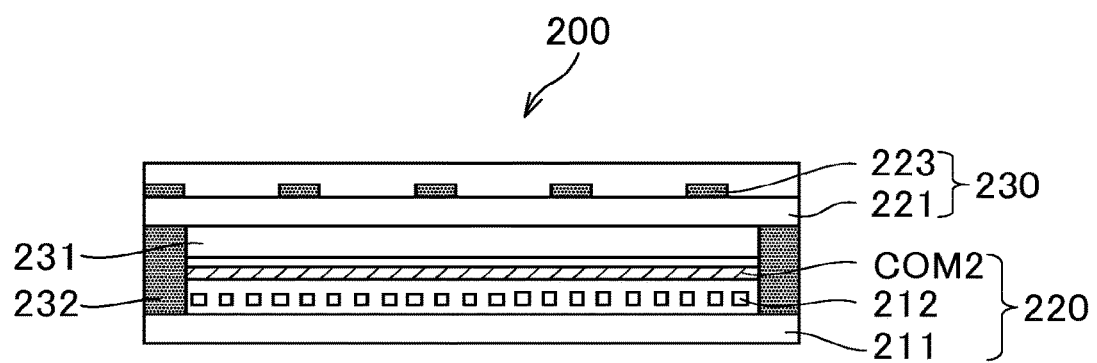
FIG. 3 is a cross-sectional view seen from line in FIG. 2.

In FIG. 3, a cross-sectional view seen from III-III line in FIG. 2 is schematically illustrated. As illustrated in FIG. 3, the liquid crystal display panel 200 with a touch panel is formed of the TFT substrate 220 in which a not illustrated thin film transistor (TFT) is formed and a circuit for controlling the alignment of liquid crystal for each pixel is formed, the color filter substrate 230 that emits an incident light as light having a wavelength of each color of RGB for each pixel by a not illustrated color filter, and a liquid crystal layer 231 that is made from liquid crystal composition confined by a sealing member 232 between the substrates.

Here, in the TFT substrate 220, as illustrated in FIG. 3, a pixel electrode 212 and the common electrode COM 2 that functions as a common electrode in the liquid crystal display are formed on a glass substrate 211, and in the color filter substrate 230, a detection electrode 223 is formed on a glass substrate 221. The detection electrode 223 has a shape extending in a direction vertical to a longitudinal direction of the common electrodes COM1 to COMn. In a touch detection operation, one or a plurality of drive pulses are respectively input in an order of common electrodes COM1 to COMn, and a transient current flows in the detection electrode 223 based on a capacitance to be formed in combination with the detection electrode 223. The current is respectively measured in the detection circuit in the drive IC for each detection electrode 223, and the determination of whether there is a touch or not is performed.

Figure 4:
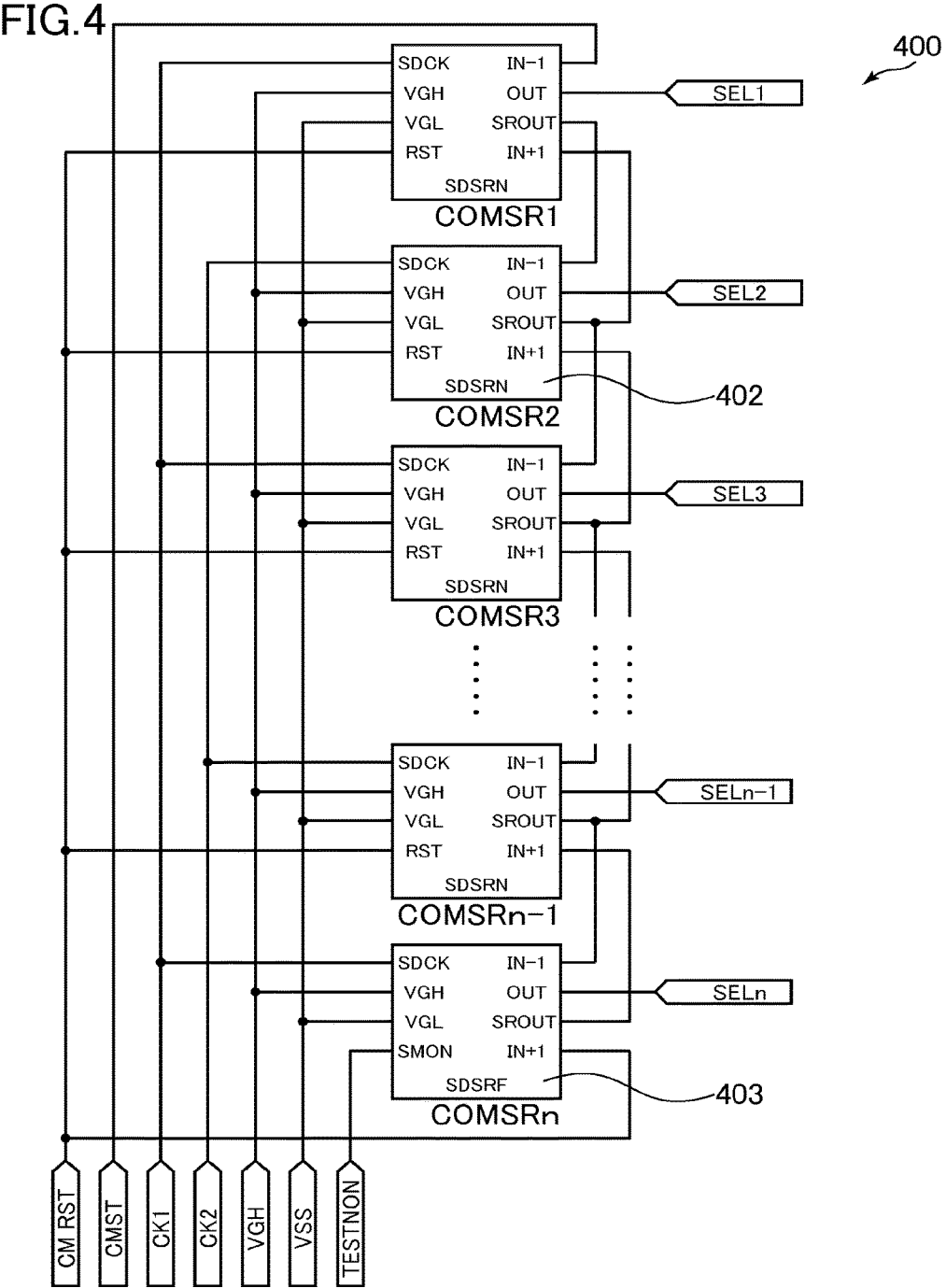
FIG. 4 is a schematic diagram illustrating a circuit configuration of a touch panel drive circuit.
Figure 5:
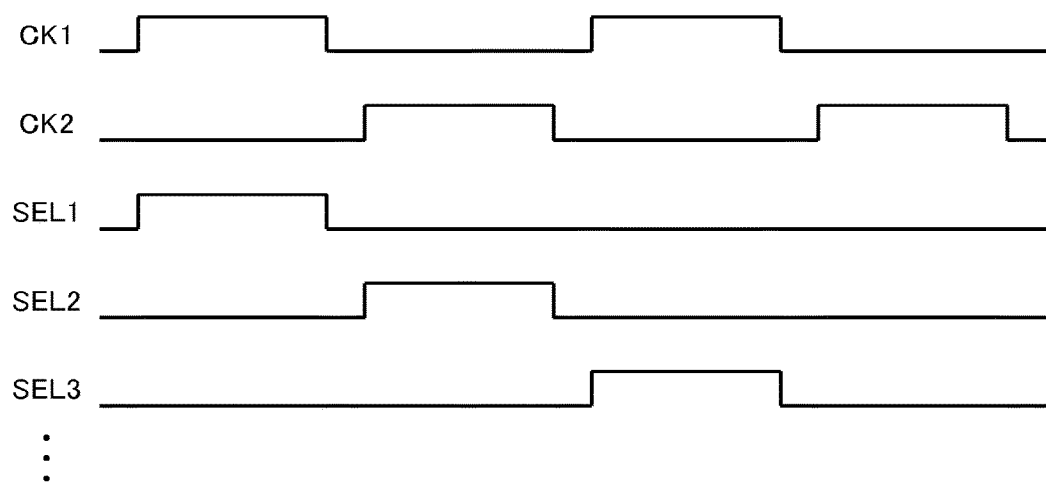
FIG. 5 is a timing chart of signals output from the circuit in FIG. 4.

In FIG. 4, a circuit configuration of the touch panel drive circuit 400 is schematically illustrated. As illustrated in FIG. 4, the touch panel drive circuit 400 is configured to include (n−1) touch panel drive repetition stage circuits 402 that are respectively provided with the common electrodes COM1 to COMn and a touch panel drive final stage circuit 403 disposed at the final stage. As illustrated in FIG. 4, the touch panel drive circuit 400 is a circuit that outputs in an order selection signals SEL 1 to SEL n which are input signals of the switching circuit region 490, and is driven by two kinds of clock signals CK1 and CK2. FIG. 5 illustrates a timing chart of the signals output from the circuit in FIG. 4. As illustrated in the timing chart, the signals are output in such a manner that the selection signals SEL 1 to SEL n are selected in an order in accordance with the output of the clock signals CK1 and CK2.

Figure 6:
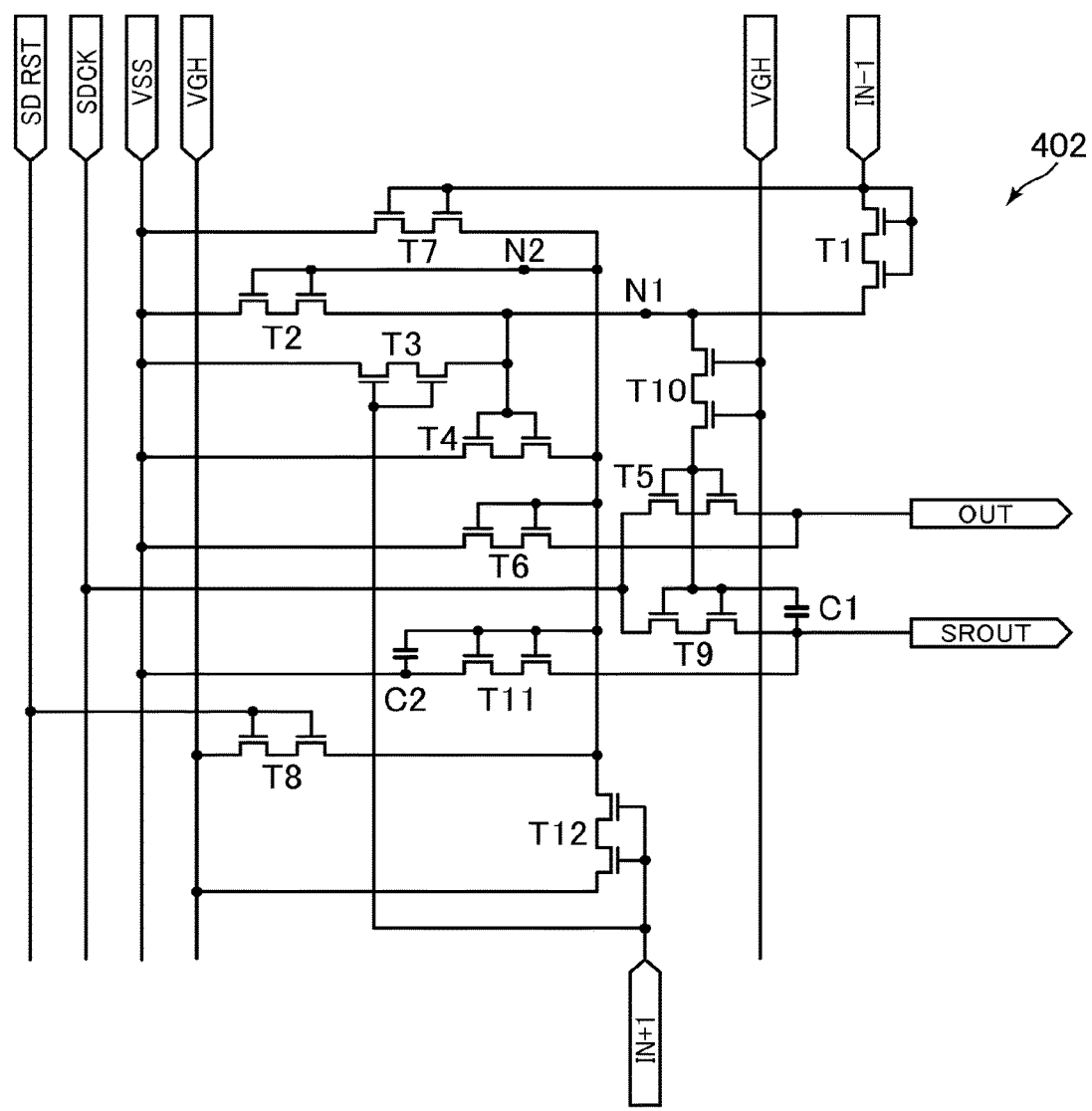
FIG. 6 is a circuit diagram illustrating an example of a touch panel drive repetition stage circuit.

FIG. 6 is a circuit diagram illustrating an example of the touch panel drive repetition stage circuit 402. As illustrated in FIG. 6, in the touch panel drive repetition stage circuits 402, one clock signal among the two kinds of the clock signals CK1 and CK2 is input. In the circuit diagram, reference symbols T represent transistors, and reference symbols N represent nodes. In the present embodiment, the transistors of the circuit are assumed to be formed of low temperature poly-silicon (LIPS). However, a transistor circuit using other semiconductors such as amorphous transistors may be used.

As illustrated in FIG. 6, the touch panel drive repetition stage circuit 402 is configured to include a diode transistor T1 that transmits an input IN−1 to the circuit from the previous stage, a transistor T2 that fixes the electric potential of a gate electrode of a transistor T5 described below at Low potential, a transistor T3 that resets a holding node N1 by an input signal from the next stage, a transistor T12 that charges a holding node N2 by an input from the next stage, a transistor T4 for resetting the holding node, a transistor T5 for outputting a clock signal SDCK to an output OUT as the selection signal SEL, a transistor T6 that fixes the output OUT at the Low potential by the holding node N2, a transistor T7 that resets the holding node N2 by the input IN−1 from the previous stage, a transistor 8 for initial resetting, a voltage alleviation transistor T10 for limiting the voltage boost by the transistor T5 to a High potential (VGH), a transistor T9 that transmits an output SROUT to the previous stage and the next stage at the same time as the output OUT, and a transistor T11 that fixes the output SROUT to the previous and next stages at the Low potential by the holding node N2. Here, each transistor has a high breakdown voltage configured as a double-gate configuration in which two transistors are arranged to overlap so as to withstand the voltage boosted by the clock signals being High potential. The High potential VGH causes the transistor to be conductive, but the VGH may be a potential equal to the High potential of the clock signal CK or may be a lower potential. Here, a capacitance C2 prevents a leakage of the holding node N2.

An operation of the touch panel drive repetition stage circuits 402 will be described. First, as a reset operation, the touch panel drive repetition stage circuit 402 sets the electric potential of the holding node N2 to High by a High potential of a reset signal SD_RST. Next, by the High potential being input from the input IN−1 at the previous stage, first the transistor T7 becomes conductive and the node N2 has Low potential (VSS), and the transistor T1 becomes conductive and the node N1 maintains to have the High potential. Therefore, the transistors T5 and T9 become conductive via the transistor T10 to which the High potential VGH is applied to the gate.

Continuously, when the clock signal SDCK has the High potential, after the High potential being output to the output OUT, and then the Low signal is output by the operation of the clock signal SDCK. Next, by an input IN+1 from the next stage having the High potential, the transistor T3 becomes conductive, the node N1 is lowered to the Low potential, and the transistor T12 becomes conductive. Therefore, the node N2 is raised to the High potential. With the transistors T6 and T11 becoming conductive by the High potential of the node N2, the output OUT and the output SROUT are fixed at the Low potential (VSS).

Figure 7:
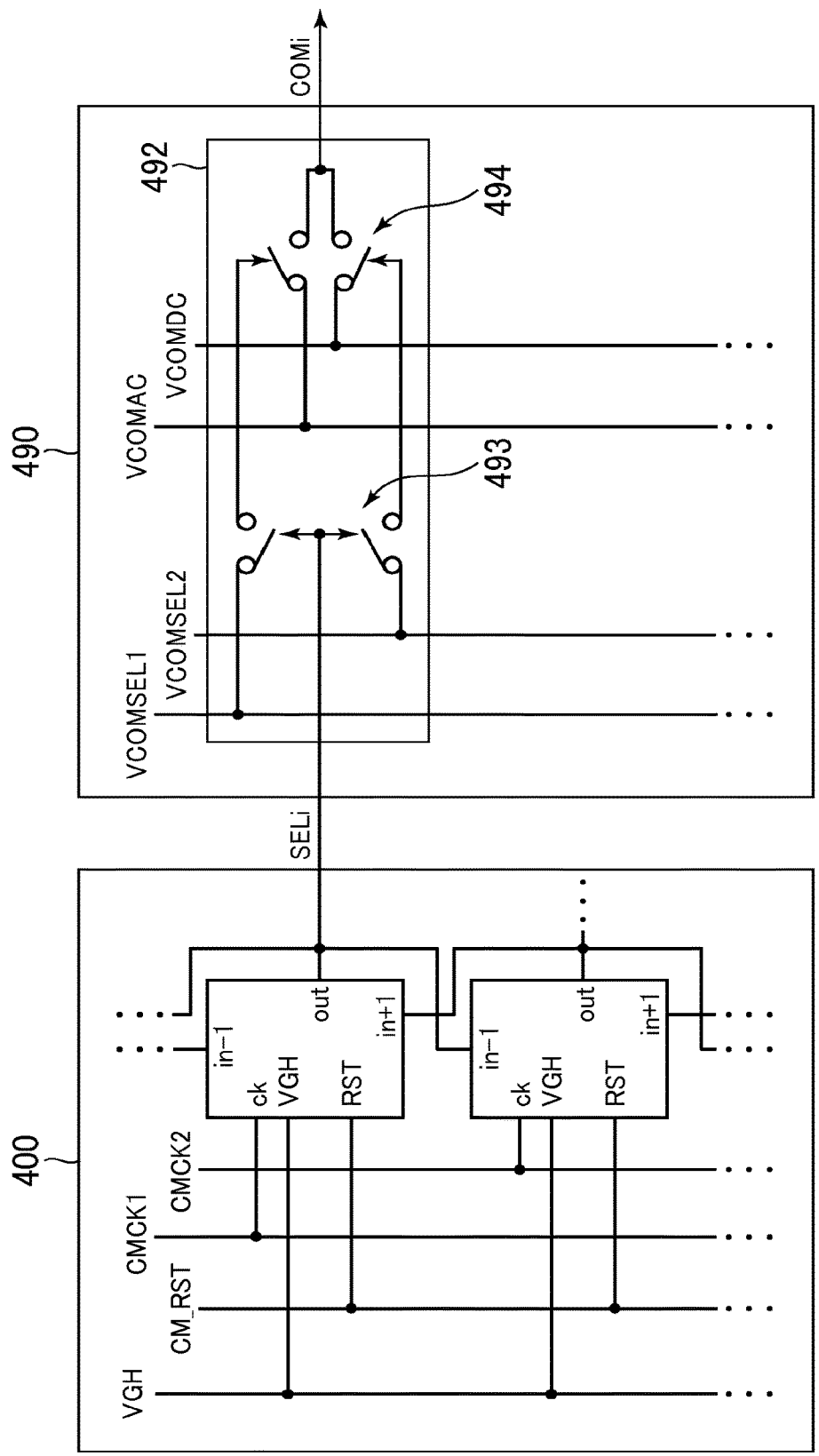
FIG. 7 is a schematic circuit diagram illustrating a switching circuit in a switching circuit region where a selection signal output from the touch panel drive circuit is input.

FIG. 7 is a diagram schematically illustrating the touch panel drive circuit 400 that outputs selection signals SEL i (i=1 to n), and the switching circuit 492 of the switching circuit region 490 to which the selection signal SEL i is input. As illustrated in FIG. 7, the switching circuit 492 includes a first switching unit 493 that is formed of two transistors which are switched by the selection signal SEL i and a second switching unit 494 that is formed of two transistors which are respectively switched by a first common voltage selection signal VCOMSEL1 and a second common voltage selection signal VCOMSEL2. Here, as described below, the first common voltage selection signal VCOMSEL1 and the second common voltage selection signal VCOMSEL2 are periodically applied with a signal so as not to have the same High potential at the same time.

Figure 8:
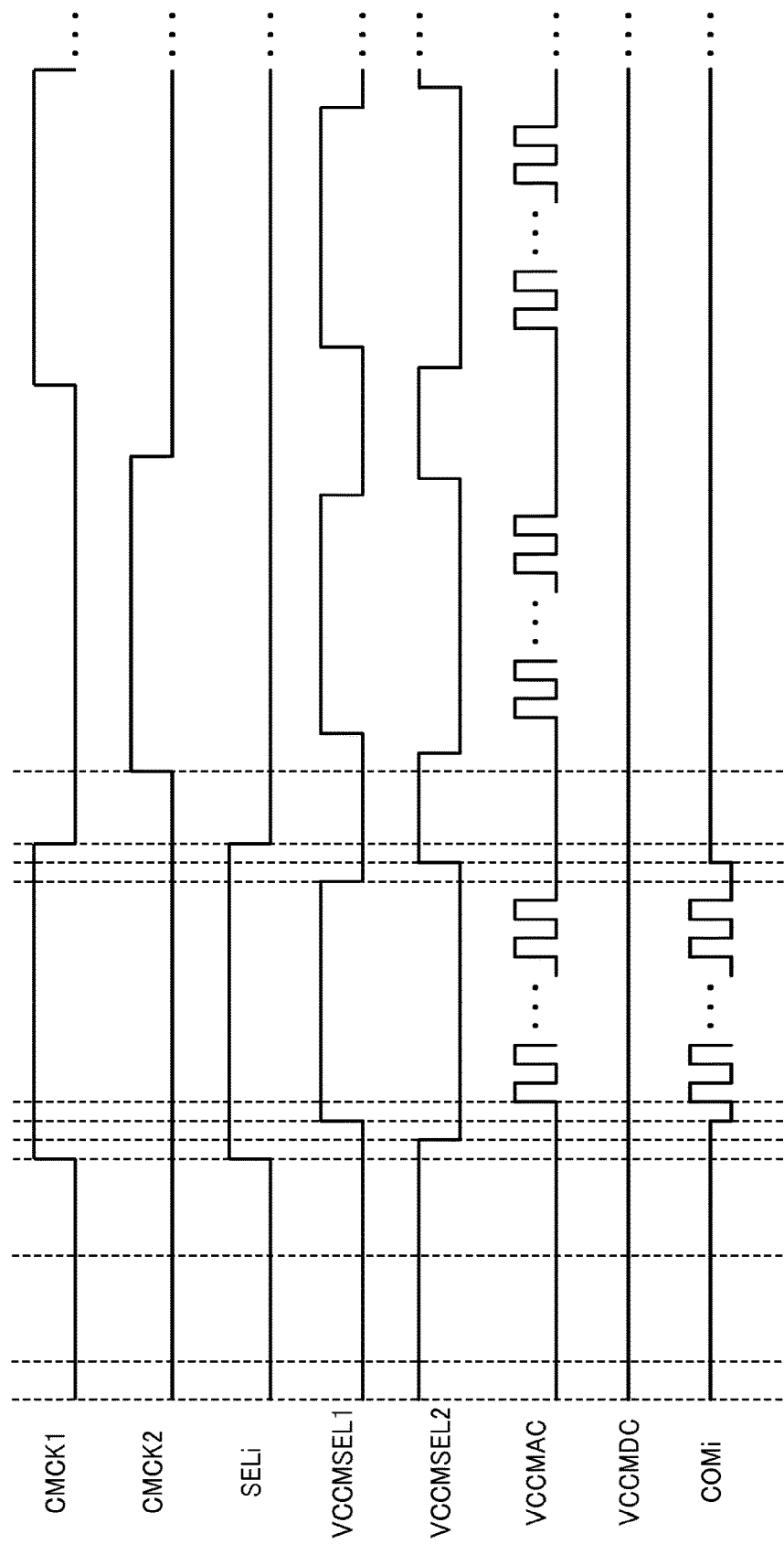
FIG. 8 is a timing chart of signals output from the circuit in FIG. 7.

FIG. 8 illustrates a timing chart of the signals from the circuit in FIG. 7. As illustrated in the timing chart and the circuit in FIG. 7, by the selection signal SEL i becoming the High potential, both of two signals of the first switching unit 493 become ON, and the both signals of the first common voltage selection signal VCOMSEL1 and the second common voltage selection signal VCOMSEL2 arrive at the second switching unit 494, in a case where the first common voltage selection signal VCOMSEL1 has the High potential, an alternative current signal VCOMAC which is a pulse having a drive voltage is applied to a common electrode COM i, and in a case where the second common voltage selection signal VCOMSEL2 has the High potential, a direct current signal VCOMDC which is the common electric potential is applied to the common electrode COM i. Therefore, only in a case where the selection signal SEL i has the High potential and the first common voltage selection signal VCOMSEL1 has the High potential, the alternative current signal VCOMAC is applied to the common electrode COM i. The same circuits of the touch panel drive circuit 400 and the switching circuit region 490 are formed in both sides of the display regions 202 as illustrated in FIG. 2, the drive pulses are applied to the same common electrode COM i at the same time.

Figure 9:
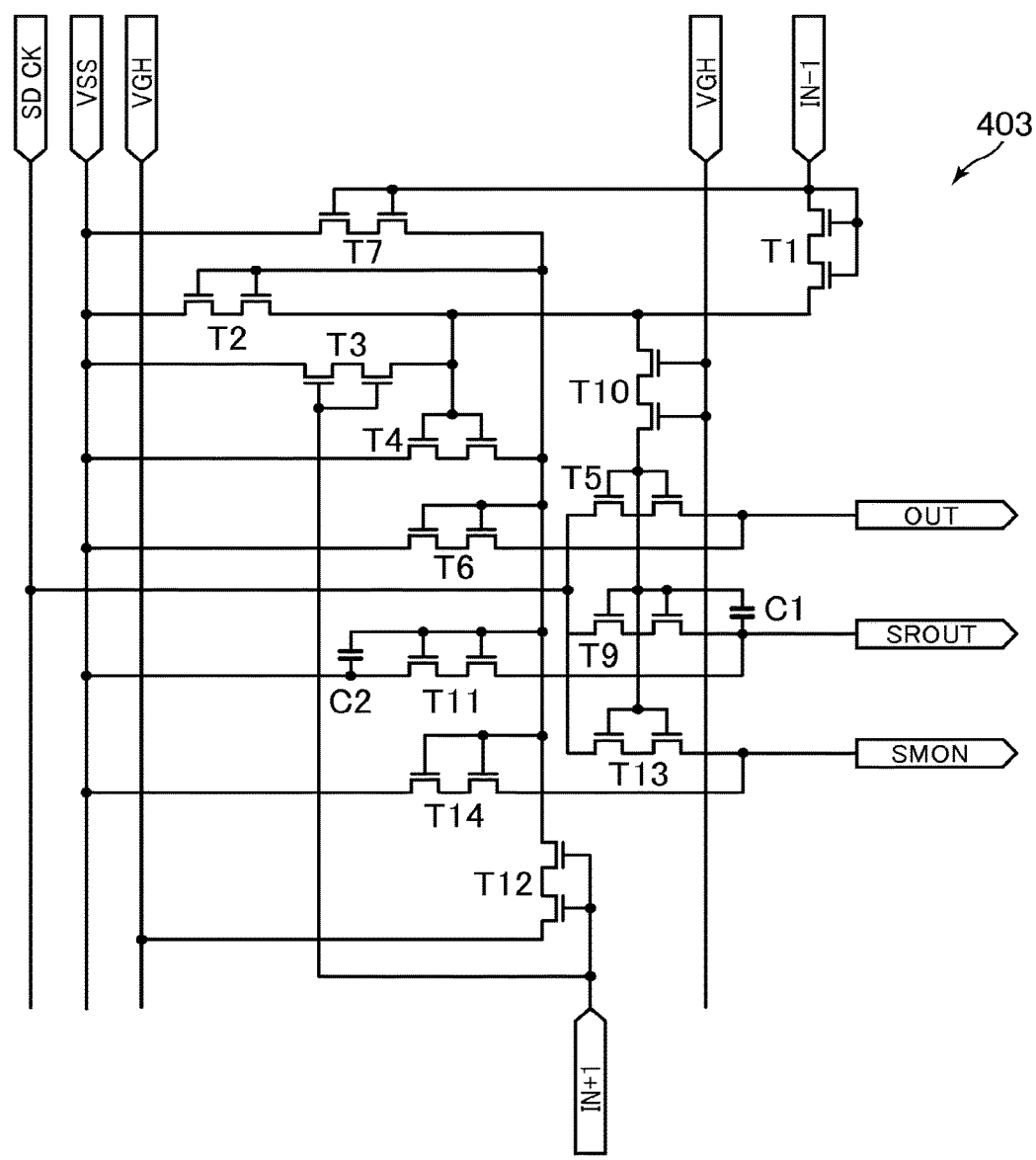
FIG. 9 is a circuit diagram illustrating an example of a touch panel drive final stage circuit.

FIG. 9 is a circuit diagram illustrating an example of the touch panel drive final stage circuit 403. A difference of the circuit diagram illustrating the touch panel drive final stage circuit 403 from that of the touch panel drive repetition stage circuit 402 in FIG. 6 is a point that there is no transistor T8 for initial resetting but has a configuration in which transistors T13 and T14 are added for outputting the output to the detection terminal. The operation is same as that of the touch panel drive repetition stage circuit 402 in FIG. 6, and a duplicated description will be omitted.

Figure 10:
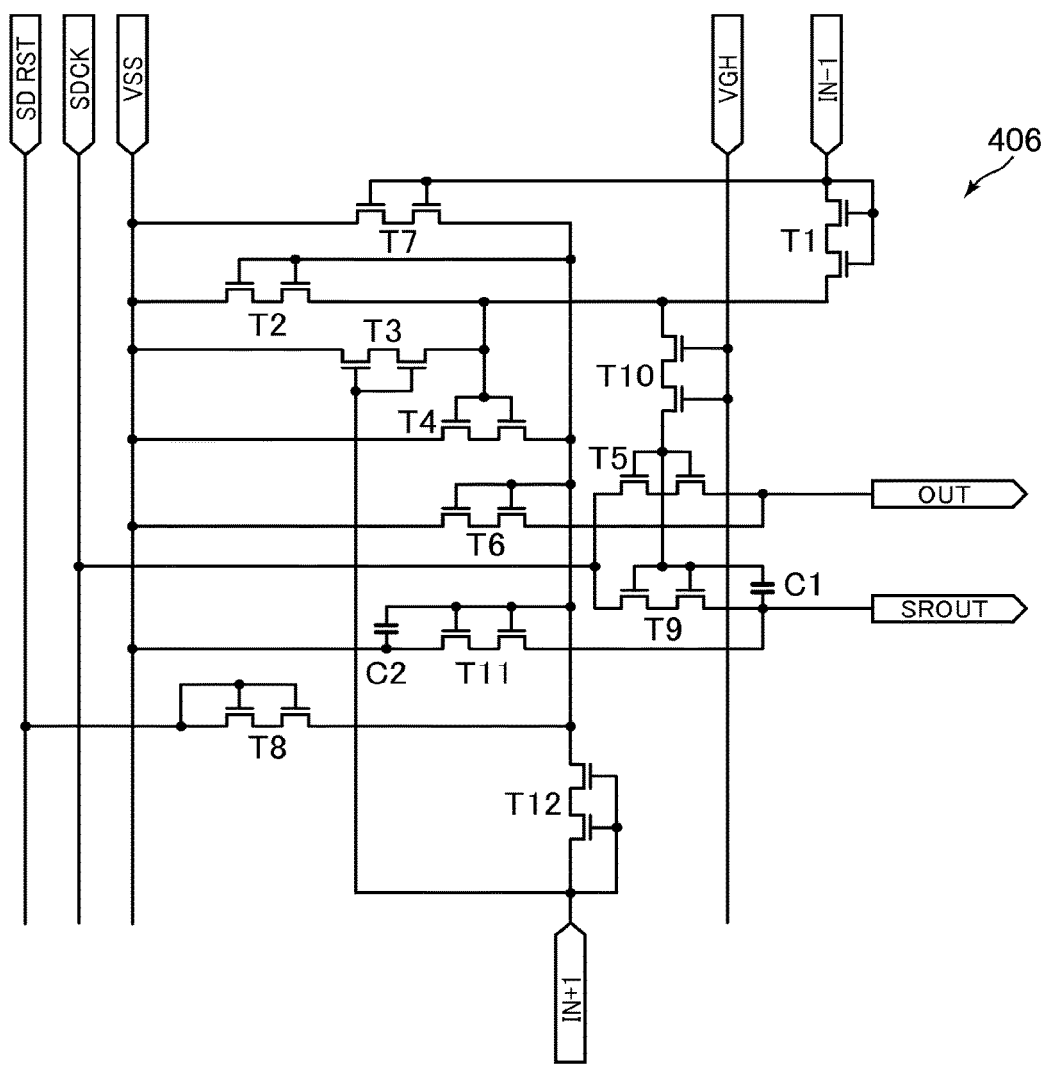
FIG. 10 is a circuit diagram illustrating a modification example of the touch panel drive repetition stage circuit in FIG. 6.

FIG. 10 is a circuit diagram illustrating a touch panel drive repetition stage circuit 406 which is a modification example of the touch panel drive repetition stage circuit 402. The touch panel drive repetition stage circuit 406 is different from the touch panel drive repetition stage circuit 402 on the point that the transistors T8 and T12 are replaced by diode connections. In a case where the leakage of the transistors T8 and T12 in the touch panel drive repetition stage circuit 402 can be small and the capacitance C2 can be large enough, it is possible to configure the touch panel drive repetition stage circuit 402 as the touch panel drive repetition stage circuit 406.

Figure 11:
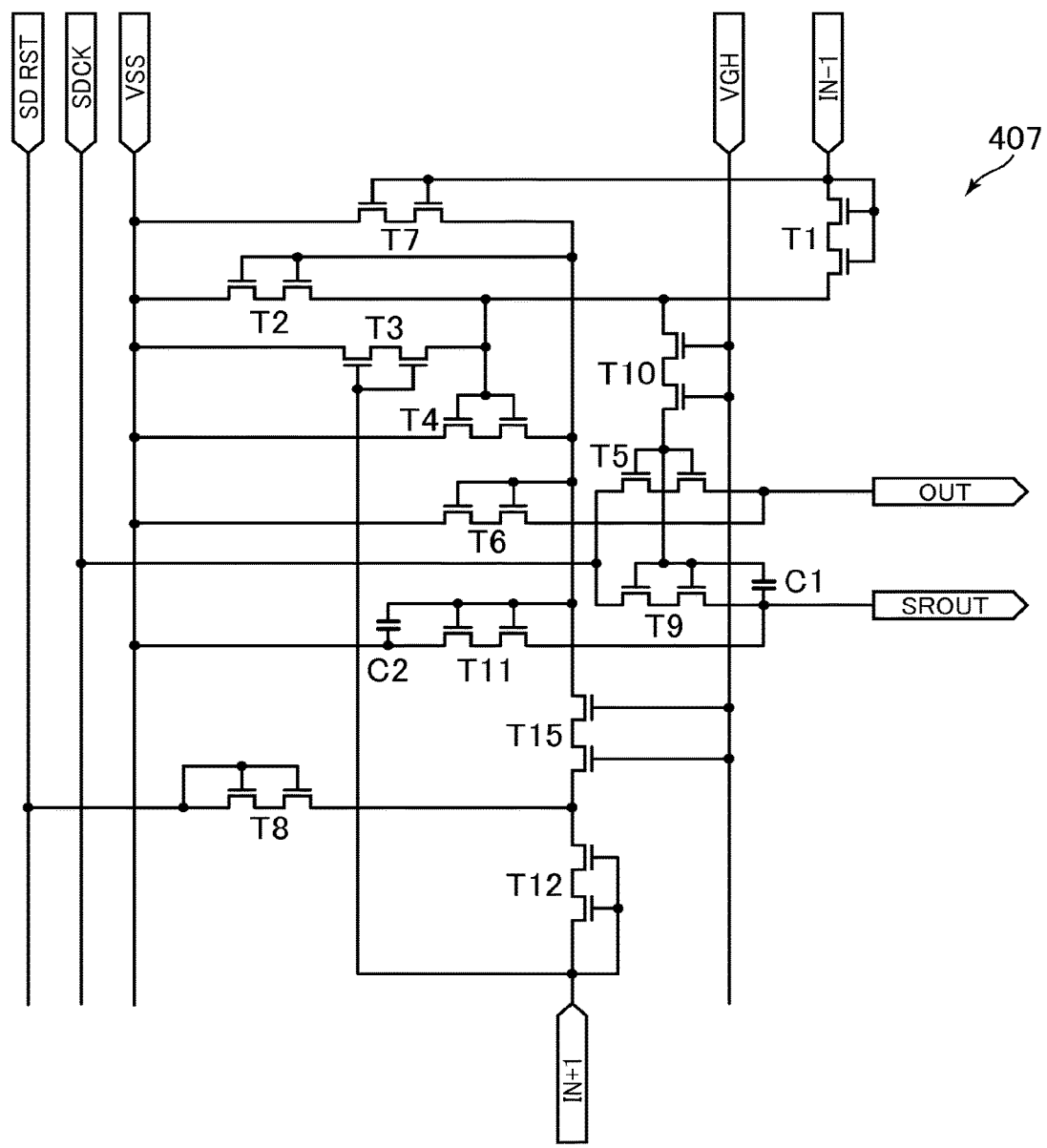
FIG. 11 is a circuit diagram illustrating a modification example of the touch panel drive repetition stage circuit in FIG. 6.

FIG. 11 is a circuit diagram illustrating a touch panel drive repetition stage circuit 407 which is a modification example of the touch panel drive repetition stage circuit 402. In the touch panel drive repetition stage circuit 407, a transistor T15 is added to the configuration of the touch panel drive repetition stage circuit 406. By disposing the transistor T15 in which the High potential VGH is connected to the gate thereof, the High potential alleviates the voltage applied to the gates of the transistors T2, T6, and T11 to which the output signal of the next stage is input, and thus it is possible to improve the reliability.

In this way, in the present embodiment, since the touch panel drive circuit 400 that drives the touch panel is formed along the end portion of strip-shaped common electrodes COM1 to COMn at the side of the display region 202, a thick wiring for equal resistances with respect to each of the common electrodes COM1 to COMn is not necessary. Therefore, it is possible to reduce the frame region outside of the display region. In addition, since the wiring where the noises are superimposed becomes short, it is possible to detect the touch with a low noise.

In addition, the touch panel drive circuit 400 described above is reset by using a common reset signal RST and the output from the next stage, thus, is driven by only two-phase clock, and the number of wirings can be reduced. Therefore, it is possible to further reduce the frame region.

Figure 12:
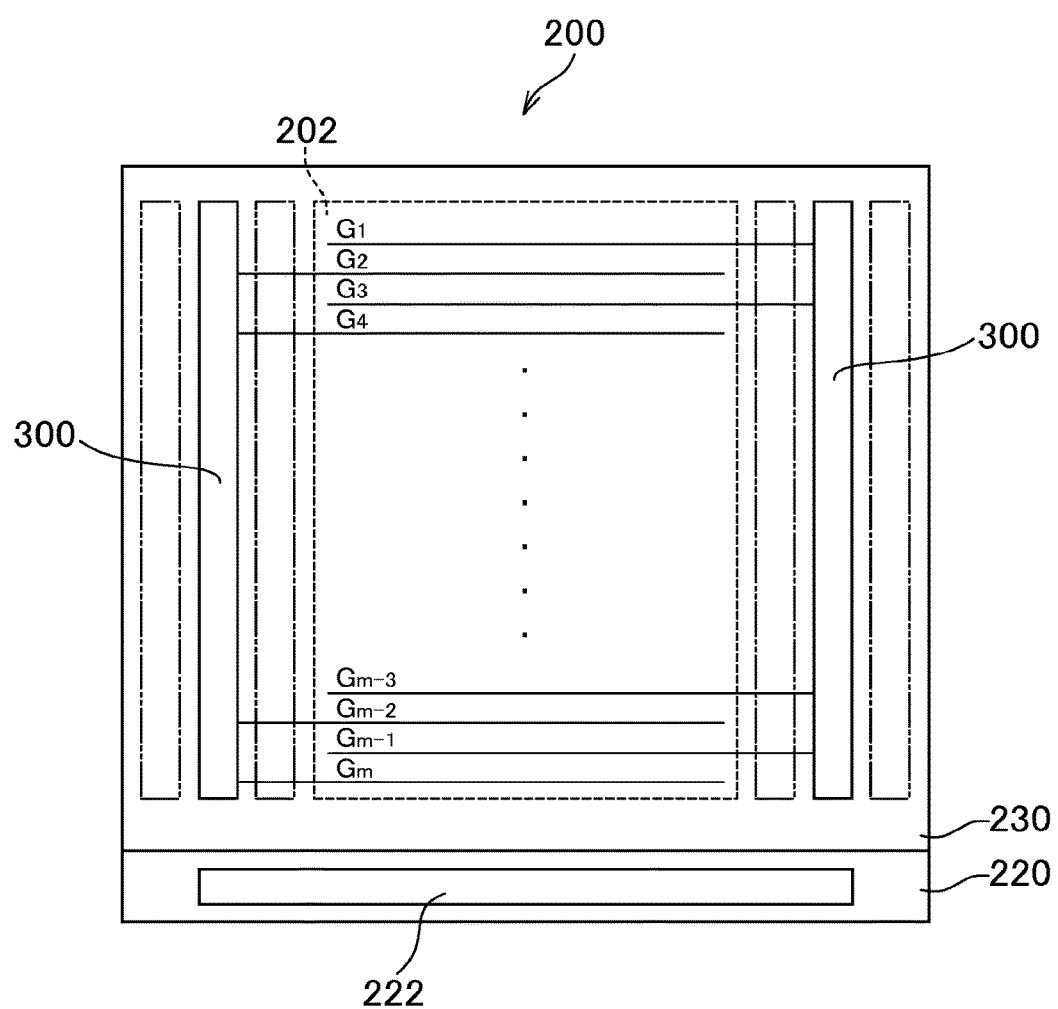
FIG. 12 is a diagram illustrating a display drive circuit and a scanning signal line scanned by the display drive circuit.

FIG. 12 is a diagram illustrating the display drive circuit 300 and the scanning signal lines G1 to Gm scanned by the display drive circuit 300. The display drive circuit 300 applies the High potential (active potential) to make the source and the drain of the TFT be conductive in an order in one selected direction among forward and reverse directions with respect to the scanning signal lines G1 to Gm. The display drive circuit 300 is disposed on both sides of the display region 202 as similar to the touch panel drive circuit 400, and as illustrated in FIG. 12, the display drive circuit 300 is configured in such a manner that the display drive circuit 300 disposed on the right side in FIG. 12 applies the High potential with respect to the odd-numbered scanning signal lines G1 to Gm, and the display drive circuit 300 disposed on the left side in FIG. 12 applies the High potential with respect to the even-numbered scanning signal lines G1 to Gm.

Figure 13:
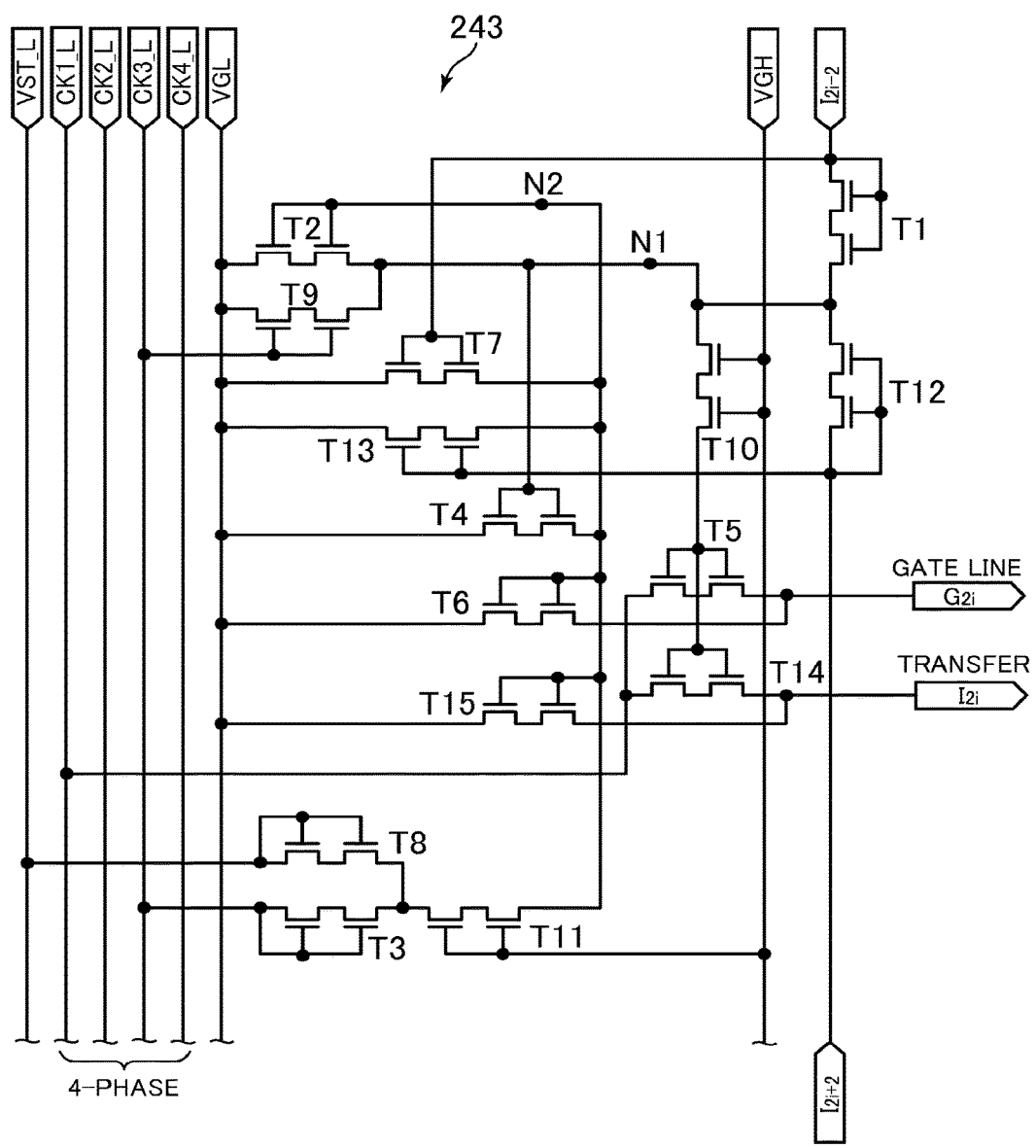
FIG. 13 is a circuit diagram illustrating an example of a display drive repetition stage circuit of the display drive circuit disposed at the left side of a display region.

In FIG. 13, a circuit configuration of a display drive repetition stage circuit 243 of the display drive circuit 300 disposed on the left side is specifically illustrated. As illustrated in FIG. 13, the display drive repetition stage circuit 243 is a circuit that operates by two clock signals CK1_L and CK3_L, and outputs the signal to a scanning signal line G2i. As similar to FIG. 6, each transistor is assumed to be formed of the LIPS.

As illustrated in FIG. 13, the circuit for outputting the signal to the scanning signal line G2i is configured to include a diode transistor T1 that is a circuit input at the time of forward scanning, a transistor T2 that fixes the electric potential of a gate electrode of a transistor T5 described below at Low potential, a transistor T3 that charges the holding node N2, a transistor T4 for resetting the holding node, the transistor T5 for outputting the High potential to the scanning signal line, a transistor T6 that fixes the scanning signal line at the Low potential by the holding node N2, a transistor T7 that resets the holding node N2 by the input signal at the time of forward scanning, a transistor 8 for initial resetting, a transistor T9 for resetting the gate electrode of the transistor T5, a voltage alleviation transistor T10 for limiting the voltage boost by the transistor T5 to a High potential (VGH), a transistor T11 that drops the voltage charged in the transistor T3 to the High potential (VGH), a diode transistor T12 that is a circuit input at the time of reverse scanning, a transistor T13 that resets the holding node N2 by the input signal at the time of reverse scanning, a transistor T14 for outputting the signal to an input signal I2i in the next stage at the same time as that of outputting to the scanning signal line, and a transistor 15 that fixes the transfer I2i at the Low potential by the holding node N2. Here, each transistor has a high breakdown voltage configured as a double-gate configuration in which two transistors are arranged to overlap so as to withstand the voltage boosted by the clock signals being High potential. The High potential VGH makes the transistor conductive, and is same as the High potential of the scanning signal line or a lower voltage.

Figure 14:
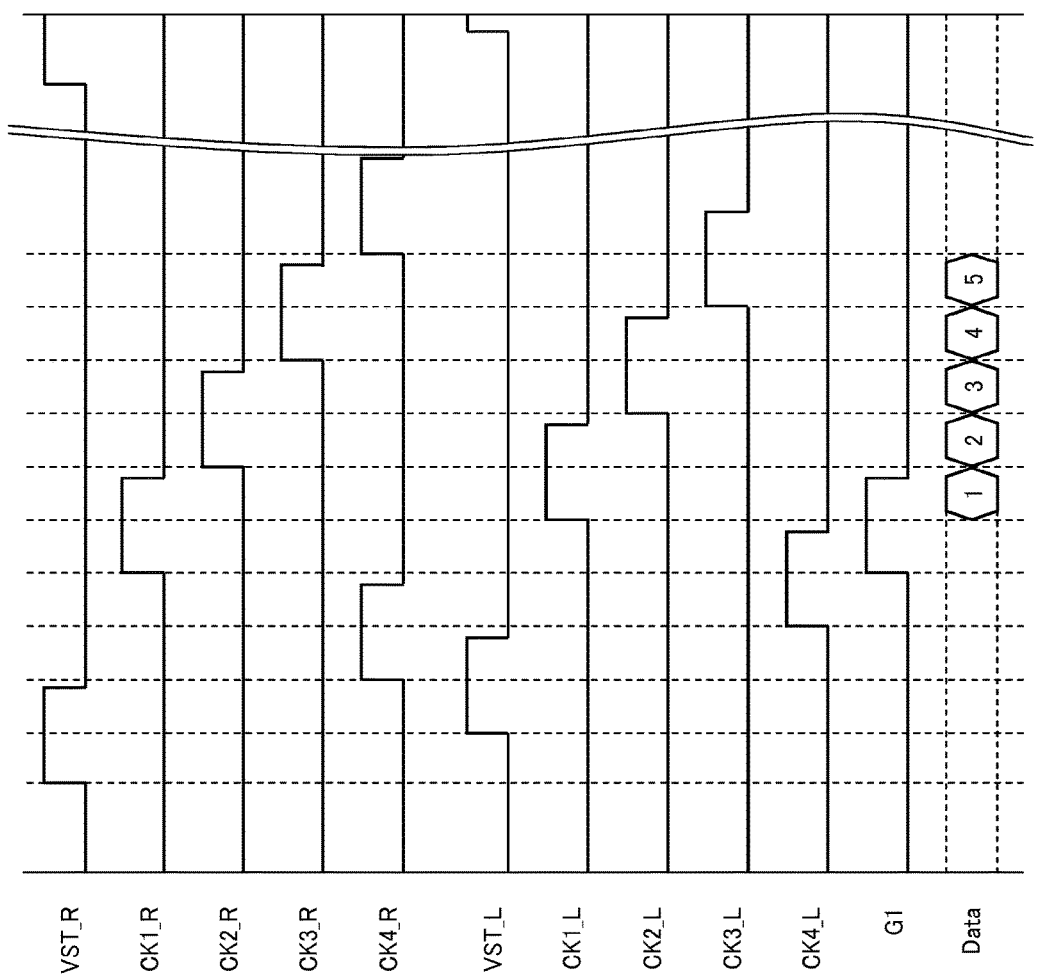
FIG. 14 is a timing chart illustrating clock signals input to the display drive circuit at the time of forward scanning.

FIG. 14 is a timing chart illustrating clock signals input to the display drive circuit 300 at the time of forward scanning. To the display drive circuit 300 at the right side, four phase clock signals CK1_R, CK2_R, CK3_R, and CK4_R are input, and to the display drive circuit 300 at the left side, four phase clock signals CK1_L, CK2_L, CK3_L, and CK4_L which are different from those of the right side are input. In addition, start signals VST_R and VST_L are respectively input at the different timing. In FIG. 14, signals at the time of forward scanning are illustrated. However, at the time of reverse scanning, the signals rise in an order from the CK4_R and CK4_L which is opposed to the order in FIG. 14.

Next, returning to FIG. 13, the operation of the display drive repetition stage circuit 243 outputting the signal to the scanning signal line G2*i* will be described. First, as a reset operation, the display drive repetition stage circuit 243 inputs a High potential of the signal of start signal VST_L of the display drive circuit 300 at the left side to set the electric potential of the holding node N2 as High potential. Next, by the High potential of an input signal I2*i*–2 of the next stage being input, the transistor T7 becomes conductive first, the node N2 is connected to the Low potential (VGL) to be a Low potential and the transistor T1 becomes conductive, and the node N1 has the High potential and is maintained. Therefore, the node N1 has a High potential via the transistor T10 to which the High potential VGH is applied to the gate, and thus the transistors T5 and T14 become conductive.

Continuously, when the clock signal CK1_L has the High potential, the High signal is output to the scanning signal line G2*i*, and then the Low signal is output by the operation of the clock signal CK1_L. Next, by the clock signal CK3_L becoming High, the transistor T3 becomes conductive and the node N2 rises to the High potential, and the transistor T9 becomes conductive to lower the node N1 to Low potential. By the transistor T6 becoming conductive by the High potential of the node N2, the scanning signal line G2*i* is connected to the Low potential (VGL) and is fixed at the Low potential.

FIG. 15 is a timing chart illustrating the clock signals at the time of forward scanning and a gate signal line to which the High potential is output at the timing when the clock signal has the High potential. As illustrated in FIG. 15, the High potential is output from the display drive circuit 300 at the right side in an order with respect to the odd-numbered scanning signal lines G1, G3, . . . , Gm–1. In the timing between the outputs of the High potentials, the High potential is output from the display drive circuit 300 at the left side in an order with respect to the even-numbered scanning signal lines G2, G4, . . . , Gm. A data signal is output to a data signal line in accordance with the output of the High potential.

FIG. 16 is a timing chart illustrating clock signals at the time of reverse scanning and a gate signal line to which the High potential is output at the timing when the clock signal has the High potential. As illustrated in FIG. 16, reverse to the case in FIG. 15, the High potential is output from the display drive circuit 300 at the left side in an order with respect to the even-numbered scanning signal lines Gm, Gm–2, . . . , G2. In the timing between the outputs of the High potentials, the High potential is output from the display drive circuit 300 at the right side in an order with respect to the odd-numbered scanning signal lines Gm–1, Gm–3, . . . , G1.

In this way, since the display drive circuit disposed so as to interpose the display region is configured to operate only by any one circuit of even-numbered scanning signal lines and odd-numbered scanning signal lines, the number of wirings can be suppressed, and thus it is possible to reduce the size of the frame that is the region outside the display region. In addition, the touch panel drive circuit also may be configured so as to operate only by any one circuit disposed so as to interpose the display region.

As described above, in the embodiment described above, since the display drive circuit has configuration of nMOS single channel, the manufacturing of the transistor circuits is simplified, and both of the touch panel drive circuit and the display drive circuit are formed at the outside of the opposing sides of the display region, and thus it is possible to suppress the size of the frame region to be small. In the present embodiment, the display drive circuit has a configuration of nMOS single channel, but may have a configuration of pMOS single channel.

In the embodiment described above, the display drive circuit is a circuit capable of scanning in both directions. However, the display drive circuit may be a circuit capable of scanning in only one direction. In addition, in the embodiment described above, a specific example of the display drive circuit is described. However, the circuit to which the present invention can be applied is not limited thereto, but can be applied to any other circuits as long as the circuit is a shift register circuit that applies the High potential (active potential) in an order with respect to a plurality of scanning signal lines arranged in the display region.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A liquid crystal display device with a touch panel comprising:
   a first substrate;
   a second substrate opposing to the first substrate, and forming an overlapped area with the first substrate;
   a liquid crystal composition sandwiched between the first substrate and second substrate;
   a display region formed in the overlapped area;
   a frame region formed in the overlapped area and outside of the display region;
   a plurality of pixels arranged in a matrix shape for forming the display region, the pixel including a pixel transistor and a pixel electrode electrically connected to the pixel transistor;
   a plurality of scanning signal lines extended in a first direction, the scanning signal line being connected in common to gates of the pixel transistors of the pixels arranged in the first direction;
   a plurality of common electrodes extended in the first direction, the common electrode being applied a common voltage so as to control an alignment of the liquid crystal composition by forming an electric field in combination with the pixel electrode;
   a plurality of detection electrodes extended in a second direction intersecting with the first direction;
   a drive integrated circuit disposed outside of the overlapped area and along the first direction, and outputting a first selection signal;
   a display drive circuit disposed in the frame region and along the second direction, and applying sequential scanning signal potentials to the scanning signal lines;
   a touch panel drive circuit disposed in the frame region and further than the display drive circuit from a standpoint of the display region, and outputting second selection signals corresponding with the common electrodes respectively;
   a switching circuit disposed in the frame region and between the display drive circuit and the display region, and electrically connecting to the common electrodes;
   a touch panel pulse signal line connecting to the switching circuit, and supplying a touch panel pulse signal; and
   a common voltage line connecting to the switching circuit, and supplying a common voltage,
   wherein the switching circuit selects the common electrode on the basis of the second selection signal and switches a connection to the selected common electrode between the touch panel pulse signal line and the common voltage line by the first selection signal, wherein the first selection signal passes through a region between the switching circuit and the touch panel drive circuit.

2. The liquid crystal display device with a touch panel according to claim 1, wherein the touch panel drive circuit and the display drive circuit are configured with only single channel transistors of any of n channel or p channel.

3. The liquid crystal display device with a touch panel according to claim 1, wherein the touch panel drive circuit operates using a two-phase clock.

4. The liquid crystal display device with a touch panel according to claim 1, wherein the display region is sandwiched between two frame regions, each frame region of the two frame regions has the display drive circuit, one of the display drive circuits disposed in one of the frame regions applies the scanning signal potential only to even-numbered scanning signal lines among the scanning signal lines and the other display drive circuit applies the scanning signal potential only to odd-numbered scanning signal lines among the scanning signal lines.

5. A liquid crystal display device with a touch panel comprising:

a rectangular display region on which an image is displayed, and has a first side and a second side adjacent to the first side;

a drive IC disposition region where a drive IC is disposed at an outside of the first side of the rectangular display region;

a plurality of scanning signal lines disposed in the rectangular display region and extended in a first direction;

a plurality of common electrodes disposed at the rectangular display region and extended in the first direction;

a display drive circuit disposed at an outside of the second side and along a second direction intersecting with the first direction, and connecting to the plurality of scanning signal lines;

a touch panel drive circuit disposed further than the display drive circuit from a standpoint of the rectangular display region and along the second direction, and connecting to selecting signal lines;

a switching circuit disposed between the display drive circuit and the second side of the rectangular display region, and connecting to the common electrodes, a first clock signal line connecting between the touch panel drive circuit and the driving IC, a second clock signal line connecting between the display drive circuit and the driving IC, and a switching signal line connecting between the switching circuit and the driving IC, wherein the switching signal line, the second clock signal line and the first clock signal line are arranged in this order in the first direction at the drive IC disposition region, wherein the switching signal line passes through a region between the switching circuit and the touch panel drive circuit.

6. The liquid crystal display device with a touch panel according to claim 5, wherein the touch panel drive circuit and the display drive circuit are configured with only single channel transistors of any of n channel or p channel.

7. The liquid crystal display device with a touch panel according to claim 5, wherein the touch panel drive circuit operates using a two-phase clock.

8. The liquid crystal display device with a touch panel according to claim 5, further comprise another display drive circuit disposed at an outside of a third side opposed to the second side, wherein, the display drive circuit disposed at the outside of the second side applies a scanning signal potential only to even-numbered scanning signal lines among the scanning signal lines, and the display drive circuit disposed at the outside of the third side applies a scanning signal potential only to odd-numbered scanning signal lines among the scanning signal lines.

* * * * *